United States Patent
Molla et al.

(10) Patent No.: US 12,479,878 B2
(45) Date of Patent: Nov. 25, 2025

(54) CRYSTALLIZATION OF 2'-FL

(71) Applicant: Glycom A/S, Hørsholm (DK)

(72) Inventors: Getachew S. Molla, Hørsholm (DK); Pierre Chassagne, Hørsholm (DK)

(73) Assignee: GLYCOM A/S, Hørsholm (DK)

( * ) Notice: Subject to any disclaimer, the term of this patent is extended or adjusted under 35 U.S.C. 154(b) by 607 days.

(21) Appl. No.: 17/906,131

(22) PCT Filed: Mar. 12, 2021

(86) PCT No.: PCT/IB2021/052073
§ 371 (c)(1),
(2) Date: Sep. 12, 2022

(87) PCT Pub. No.: WO2021/181349
PCT Pub. Date: Sep. 16, 2021

(65) Prior Publication Data
US 2023/0114668 A1   Apr. 13, 2023

(30) Foreign Application Priority Data
Mar. 12, 2020   (DK) .............. PA 2020 00335

(51) Int. Cl.
| | | |
|---|---|---|
| *C07H 3/00* | (2006.01) |
| *C07H 1/06* | (2006.01) |
| *C07H 3/06* | (2006.01) |
| *C13B 30/02* | (2011.01) |

(52) U.S. Cl.
CPC ............ *C07H 3/06* (2013.01); *C07H 1/06* (2013.01); *C13B 30/021* (2013.01)

(58) Field of Classification Search
None
See application file for complete search history.

(56) References Cited

U.S. PATENT DOCUMENTS

| | | |
|---|---|---|
| 7,521,212 B1 | 4/2009 | Samain et al. |
| 2017/0015253 A1 | 1/2017 | Shibata et al. |
| 2017/0369920 A1* | 12/2017 | Dekany ............. C12P 19/18 |
| 2018/0298389 A1 | 10/2018 | Seo et al. |

FOREIGN PATENT DOCUMENTS

| | | |
|---|---|---|
| WO | 0104341 A1 | 1/2001 |
| WO | 2010070104 A1 | 6/2010 |
| WO | 2010070616 A2 | 6/2010 |
| WO | 2010115934 A1 | 10/2010 |
| WO | 2010115935 A1 | 10/2010 |
| WO | 2010142305 A1 | 12/2010 |
| WO | 2011150939 A1 | 12/2011 |
| WO | 2012097950 A1 | 7/2012 |
| WO | 2012112777 A2 | 8/2012 |
| WO | 2014009921 A2 | 1/2014 |
| WO | 2014069625 A1 | 5/2014 |
| WO | 2014086373 A1 | 6/2014 |
| WO | 2015032412 A1 | 3/2015 |
| WO | 2015032413 A1 | 3/2015 |
| WO | 2015036138 A1 | 3/2015 |
| WO | 2015188834 A1 | 12/2015 |
| WO | 2015197082 A1 | 12/2015 |
| WO | 2016038192 A1 | 3/2016 |
| WO | 2016095924 A1 | 6/2016 |
| WO | 2017101958 A1 | 6/2017 |
| WO | 2017134176 A1 | 8/2017 |
| WO | 2017153452 A1 | 9/2017 |
| WO | 2017188684 A1 | 11/2017 |
| WO | 2018077892 A1 | 5/2018 |
| WO | 2018164937 A1 | 9/2018 |
| WO | 2018194411 A1 | 10/2018 |
| WO | 2019008133 A1 | 1/2019 |

OTHER PUBLICATIONS

Drouillard et al. Angew. Chem. Int. Ed. 45, 1778-1780 (2006).
Fort et al. J. Chem. Soc., Chem. Comm. 2558-2560 (2005).

* cited by examiner

*Primary Examiner* — Stefanie J Cohen
(74) *Attorney, Agent, or Firm* — Neal, Gerber & Eisenberg LLP

(57) ABSTRACT

The invention relates to a method for selective crystallization of 2'-FL from an aqueous solution comprising 2'-FL and one or more other fucosylated carbohydrates by adding acetic acid to the solution.

20 Claims, No Drawings

CRYSTALLIZATION OF 2'-FL

CROSS-REFERENCE TO RELATED APPLICATION

This application is a national stage entry pursuant to 35 U.S.C. § 371 of International Application No. PCT/IB2021/052073, filed on Mar. 12, 2021, which claims priority to Denmark Patent Application No. PA 2020 00335 filed on Mar. 12, 2020, the contents of all of which are fully incorporated herein by reference.

FIELD OF THE INVENTION

The invention relates to a method of crystallizing 2'-O-fucosyllactose (2'-FL) from an aqueous solution, using acetic acid, particularly from an aqueous solution obtained in a biotechnological production of 2'-FL.

BACKGROUND OF THE INVENTION

Crystallization or recrystallization is one of the simplest and cheapest methods to isolate a product from a reaction mixture, separate it from contaminations/impurities and obtain pure substance. Isolation or purification that uses crystallization makes the whole technological process more robust and cost-effective and thus advantageous.

2'-FL may exist in different crystalline forms, see for example WO 2011/150939 (polymorphs I and II), WO 2014/009921 (polymorphs A, B and C) or WO 2014/069625. In this regard, crystallization of 2'-FL can advantageously be a part of its production, especially in its purification and isolation process from its aqueous culture medium in which it has been produced. WO 2014/086373 discloses crystallizing 2'-FL, using methanol, from a freeze-dried powder, derived from an aqueous fermentation broth. WO 2015/188834 discloses a method for selective crystallization of 2'-FL polymorph II from an aqueous solution comprising 2'-FL and a fucosylated carbohydrate other than 2'-FL, preferably DFL, by adding one or more C1-C4 alcohols, preferably methanol, to the solution. WO 2016/095924 discloses an alternative method for selective crystallization of 2'-FL polymorph II from an aqueous solution comprising 2'-FL and one or more other fucosylated carbohydrates by adding acetic acid to the solution. The latter method provides crystalline 2'-FL especially suitable for dietary/food/infant formula applications. WO 2018/164937 claims a process for making crystalline 2'-FL by evaporative crystallization from its supersaturated aqueous solution that comprises no greater than 1% (by weight) organic solvent.

With respect to crystallized 2'-FL, there is still a need for an improved crystallization method that consumes lower amount of antisolvent(s) and/or produces crystals with improved properties such as stable crystal morphology, better filterability, lower level of moisture/volatiles, faster powder drying and/or better dry powder physical and rheological properties, while maintaining or even exceeding the good yield and the purity provided by the prior art processes.

SUMMARY OF THE INVENTION

The first aspect of the invention relates to a method for crystallizing 2'-FL, advantageously polymorph II of 2'-FL, comprising:
1) providing an aqueous solution or syrup comprising 2'-FL,
2) adding a suspension of crystalline 2'-FL, advantageously polymorph II of 2'-FL, in acetic acid to the aqueous solution or syrup comprising 2'-FL, thereby generating a slurry,
3) adding acetic acid to the slurry to obtain a crystalline mass, and
4) filtering the crystalline 2'-FL, advantageously polymorph II of 2'-FL, from the crystalline mass.

The second aspect of the invention relates to crystalline 2'-FL, advantageously polymorph II of 2'-FL, obtained or obtainable according to the first aspect of the invention.

The third aspect of the invention relates to crystalline 2'-FL, advantageously polymorph II of 2'-FL, that has the following assay determined by combination of quantitative measurements: 2'-FL: at least 97%, DFL: less than 2%, and acetic acid: less than 0.5%.

The fourth aspect of the invention relates to the a nutritional or pharmaceutical composition comprising the crystalline 2'-FL, advantageously polymorph II of 2'-FL, according to the second or the third aspect of the invention.

The fifth aspect of the invention relates to the use of the crystalline 2'-FL, advantageously polymorph II of 2'-FL, according to the second or the third aspect of the invention in the preparation of food compositions or food supplements.

The sixth aspect of the invention relates to the use of the crystalline 2'-FL, advantageously polymorph II of 2'-FL, according to the second or the third aspect of the invention as food or food supplement.

DETAILED DESCRIPTION OF THE INVENTION

For the crystallization of 2'-FL polymorph II, preferably from an aqueous solution obtained in a microbial fermentative production of 2'-FL followed by one or more purification steps of the fermentation culture medium and which aqueous solution comprises, besides 2'-FL, one or more other fucosylated carbohydrate type by-products such as difucosyllactose (DFL), the solvent-antisolvent type crystallization method from aqueous acetic acid (see WO 2016/095924) have been proved technically advantageous that provides crystalline 2'-FL with good purity, suitable and approved for use in nutritional compositions and infant formula. The crystalline 2'-FL polymorph II obtainable by the method disclosed in WO 2016/095924 typically contains a residual acetic acid content of less than 1%, preferably no more than 0.5%, which does not represent any safety or health concern. However, to achieve a high yield and good purity of the crystallized 2'-FL, cca. 5-7 liters of acetic acid per kilogram of 2'-FL in the aqueous solution have been used in the crystallization.

The present inventors have made an effort to reduce the amount of acetic acid used for the crystallization while keeping the good crystallization yield and the purity of 2'-FL provided by the original method and surprisingly discovered that the crystals so-produced possess beneficial properties and crystal quality.

Accordingly, a method is provided for crystallizing 2'-FL, advantageously polymorph II of 2'-FL, comprising:
1) providing an aqueous solution or syrup comprising 2'-FL,
2) adding a suspension of crystalline 2'-FL, advantageously polymorph II of 2'-FL, in acetic acid to the aqueous solution or syrup comprising 2'-FL, thereby generating a slurry, 3) adding acetic acid to the slurry to obtain a crystalline mass, and
4) filtering the crystalline 2'-FL, advantageously polymorph II of 2'-FL, from the crystalline mass.

2'-FL polymorph II refers to a crystalline modification of 2'-FL disclosed in WO 2011/150939 that comprises X-ray powder diffraction reflections, based on a measurement using CuKα radiation, at 16.98±0.20, 13.65±0.20 and 18.32±0.20 2Θ angles, more preferably at 16.98±0.20, 13.65±0.20, 18.32±0.20 and 21.70±0.20 2Θ angles, even more preferably at 16.98±0.20, 13.65±0.20, 18.32±0.20, 21.70±0.20 and 15.22±0.20 2Θ angles, most preferably at 16.98±0.20, 13.65±0.20, 18.32±0.20, 21.70±0.20, 15.22±0.20 and 20.63±0.20 2Θ angles, in particular at 16.98±0.20, 13.65±0.20, 18.32±0.20, 21.70±0.20, 15.22±0.20, 20.63±0.20 and 11.94±0.20 2Θ angles.

The above method provides crystalline 2'-FL, preferably 2'-FL polymorph II, possessing beneficial features compared to 2'-FL crystalline material known from the prior art. Moreover, the claimed crystallizing method is characterized by lower antisolvent (acetic acid) consumption (meaning more economical process) while the crystallization yield and the crystal purity (typically measured by HPLC) is not reduced.

The first step of the method is the provision of an aqueous solution or syrup comprising 2'-FL. The aqueous solution or syrup does not comprise organic solvent(s) and is preferably homogenous. If it is an aqueous solution, it does not need to be a supersaturated solution with respect to 2'-FL. A supersaturated solution with respect to 2'-FL is a solution that contains more than the maximum amount of 2'-FL that is capable of being dissolved at a given temperature. "The maximum amount of 2'-FL that is capable of being dissolved at a given temperature" is in fact the solubility of 2'-FL, that is a thermo-chemical property referring to the ability for 2'-FL to dissolve in a solvent. It is measured in terms of the maximum amount of solute dissolved in a solvent at equilibrium, here in water. The resulting solution is called a saturated solution. The solubility of 2'-FL in water can be measured e.g. as disclosed in Example 15 of WO 2018/164937, which is hereby incorporated by reference. The concentration of 2'-FL in the aqueous solution or syrup is at least 40 wt %, preferably at least 45 wt %, more preferably at least 50 wt %, even more preferably at least 53 wt % such as 53-68 wt %, 55-61 wt %, 58-63 wt % or 57-61 wt % (determined by HPLC).

In one embodiment, the aqueous solution or syrup comprising 2'-FL is provided at an elevated temperature (higher than room temperature) or heated up to an elevated temperature before conducting the next step. The elevated temperature is at least 35° C., preferably at least 45° C., such as around 45-55° C. or 50±2° C.

The aqueous solution or syrup containing 2'-FL disclosed above may comprise one or more other carbohydrates or carbohydrate derivatives, depending on how 2'-FL has been previously produced. 2'-FL may be made by chemical total synthesis from simpler carbohydrate precursors which synthesis comprises chemical fucosylation of a suitably protected lactose acceptor; such methods are disclosed e.g. in WO 2010/070616, WO 2010/115934, WO 2010/115935, WO 2014/009921, WO 2015/032413, WO 2016/038192, WO 2017/134176 or WO 2017/153452. The carbohydrate derivatives other than 2'-FL contaminating 2'-FL are typically intermediary derivatives in the synthetic route towards 2'-FL disclosed therein, especially the final intermediates before complete deprotection to 2'-FL. Such final intermediates are fully or partially protected 2'-FL derivatives wherein the protecting groups may be acyl (mainly acetyl or benzoyl), optionally substituted benzyl, acetal or ketal (mainly isopropylidene or benzylidene) and/or silyl. In fermentative production of 2'-FL (see e.g. Drouillard et al. Angew. Chem. Int. Ed. 45, 1778 (2006), WO 2012/097950, WO 2012/112777, WO 2015/032412, WO 2015/188834, WO 2016/095924), typical carbohydrate by-products may comprise fucosylated carbohydrates other than 2'-FL and/or lactose and/or lactulose and/or fucose and/or glucose and/or sucrose and/or galactose and/or FLU (2'-O-fucosyl-lactulose) and/or FFL (Fuc(α1-2)Fuc(α1-2)Gal(β1-4)Glc). The fucosylated carbohydrate other than 2'-FL can be any other monofucosylated lactose that can be formed during fermentation as a result of a deficient, defective or impaired fucosylation other than an α-1,2-fucosylation on the galactose moiety of lactose (e.g. one leading to 3-O-fucosyllactose, 3-FL), or of fucose migration on 2'-FL under the cultivation condition or post-fermentative operations, or of fucose hydrolysis from multifucosylated, preferably difucosylated, lactose; or a multifucosylated, preferably difucosylated, lactose that can be formed as a result of overfucosylation of lactose under the cultivation condition. The difucosylated lactose is preferably 2,2'-di-O-fucosyllactose or 2',3-di-O-fucosyllactose (DFL), particularly DFL as a characteristic by-product formed in a fermentative production of 2'-FL. Other carbohydrate contaminants that can be formed during fermentation or in post-fermentative purification/isolation steps are FLU or lactulose (by rearrangement), fucose, glucose, galactose or lactose (as a result of hydrolysis of product and intermediates), glucose, lactose or sucrose (as unconsumed educts or ingredients added during the fermentation).

The total solid content of the aqueous solution or syrup according to step 1) is at least 57° Bx (degrees Brix) as measured with refractometer, as disclosed in the experimental part, such as 57-80, 60-80, 65-80, 70-80, 65-75 or 70-75° Bx. It refers to any solute dissolved in the aqueous solution, that is it includes substances other than 2'-FL and its accompanying carbohydrate derivates as disclosed above, e.g. salts.

In one embodiment of step 1), the aqueous solution or syrup containing 2'-FL has a total solid content of 67-77° Bx and 52-62 wt % of dissolved 2'-FL as estimated by HPLC.

In one embodiment of step 1), the aqueous solution or syrup containing 2'-FL has a total solid content of 70-75° Bx and 56-62 wt % of dissolved 2'-FL as estimated by HPLC.

In one embodiment of step 1), the aqueous solution or syrup containing 2'-FL has a total solid content of 67-71° Bx and 52-56 wt % of dissolved 2'-FL as estimated by HPLC.

In one embodiment of step 1), the aqueous solution or syrup containing 2'-FL has a total solid content of 67-77° Bx and 62-70 wt %, such as 64-68 wt %, of dissolved 2'-FL as estimated by HPLC.

In one embodiment of step 1), the aqueous solution or syrup containing 2'-FL has a total solid content of 70-75° Bx and 62-70 wt %, such as 64-68 wt %, of dissolved 2'-FL as estimated by HPLC.

In one embodiment of step 1), the aqueous solution or syrup containing 2'-FL has a total solid content of 67-71° Bx and 62-70 wt %, such as 64-68 wt %, of dissolved 2'-FL as estimated by HPLC.

In one embodiment of step 1), the aqueous solution or syrup containing 2'-FL comprises DFL and optionally lactose as accompanying carbohydrates.

In one embodiment of step 1), the aqueous solution or syrup containing 2'-FL comprises DFL wherein the 2'-FL:

DFL weight ratio is more than 2, preferably more than 4, more preferably more than 6, particularly between 8-13.

In one embodiment of step 1), the aqueous solution or syrup containing 2'-FL comprises DFL and lactose, wherein the 2'-FL:lactose weight ratio is 10-110 and the DFL:lactose weight ratio is 1-10.

In one embodiment of step 1), the aqueous solution or syrup containing 2'-FL comprises DFL and lactose, wherein the 2'-FL:DFL weight ratio is more than 6, preferably 8-13, the 2'-FL:lactose weight ratio is 10-110 and the DFL:lactose weight ratio is 1-10.

In one embodiment of step 1), the aqueous solution or syrup containing 2'-FL comprises DFL and lactose, wherein the 2'-FL:DFL weight ratio is more than 13, preferably more than 25, such as more than 50, and the DFL:lactose weight ratio is less than 1.

In one embodiment of step 1), the aqueous solution or syrup containing 2'-FL has a total solid content of 67-75° Bx and 52-62 wt % of dissolved 2'-FL as estimated by HPLC, and wherein the 2'-FL:DFL weight ratio is 8-13.

In one embodiment of step 1), the aqueous solution or syrup containing 2'-FL has a total solid content of 70-75° Bx and 56-62 wt % of dissolved 2'-FL as estimated by HPLC, and wherein the 2'-FL:DFL weight ratio is more than 6, preferably 8-13, the 2'-FL:lactose weight ratio is 10-110 and the DFL:lactose weight ratio is 1-10.

In one embodiment of step 1), the aqueous solution or syrup containing 2'-FL has a total solid content of 67-71° Bx and 52-56 wt % of dissolved 2'-FL as estimated by HPLC, and wherein the 2'-FL:DFL weight ratio is more than 6, preferably 8-13, the 2'-FL:lactose weight ratio is 20-50 and the DFL:lactose weight ratio is 2-6.

In one embodiment of step 1), the aqueous solution or syrup containing 2'-FL has a total solid content of 67-77° Bx and 62-70 wt %, such as 64-68 wt %, of dissolved 2'-FL as estimated by HPLC, and wherein the 2'-FL:DFL weight ratio is more than 13, preferably more than 25, such as more than 50, and the DFL:lactose weight ratio is less than 1.

In one embodiment of step 1), the aqueous solution or syrup containing 2'-FL has a total solid content of 70-75° Bx and 62-70 wt %, such as 64-68 wt %, of dissolved 2'-FL as estimated by HPLC, and wherein the 2'-FL:DFL weight ratio is more than 13, preferably more than 25, such as more than 50, and the DFL:lactose weight ratio is less than 1.

In one embodiment of step 1), the aqueous solution or syrup containing 2'-FL has a total solid content of 67-71° Bx and 62-70 wt %, such as 64-68 wt %, of dissolved 2'-FL as estimated by HPLC, and wherein the 2'-FL:DFL weight ratio is more than 13, preferably more than 25, such as more than 50, and the DFL:lactose weight ratio is less than 1.

In one embodiment of step 1), the aqueous solution or syrup containing 2'-FL has a total solid content of 67-75° Bx and 52-62 wt % of dissolved 2'-FL as estimated by HPLC, and provided at least at 45° C., preferably at 50±2° C.

In one embodiment of step 1), the aqueous solution or syrup containing 2'-FL has a total solid content of 70-75° Bx and 56-62 wt % of dissolved 2'-FL as estimated by HPLC, and provided at least at 45° C., preferably at 50±2° C.

In one embodiment of step 1), the aqueous solution or syrup containing 2'-FL has a total solid content of 67-71° Bx and 52-56 wt % of dissolved 2'-FL as estimated by HPLC, and provided at least at 45° C., preferably at 50±2° C.

In one embodiment of step 1), the aqueous solution or syrup containing 2'-FL has a total solid content of 67-77° Bx and 62-70 wt %, such as 64-68 wt %, of dissolved 2'-FL as estimated by HPLC, and provided at least at 45° C., preferably at 50±2° C.

In one embodiment of step 1), the aqueous solution or syrup containing 2'-FL has a total solid content of 70-75° Bx and 62-70 wt %, such as 64-68 wt %, of dissolved 2'-FL as estimated by HPLC, and provided at least at 45° C., preferably at 50±2° C.

In one embodiment of step 1), the aqueous solution or syrup containing 2'-FL has a total solid content of 67-71° Bx and 62-70 wt %, such as 64-68 wt %, of dissolved 2'-FL as estimated by HPLC, and provided at least at 45° C., preferably at 50±2° C.

In one embodiment of step 1), the aqueous solution or syrup containing 2'-FL comprises DFL and optionally lactose as accompanying carbohydrates, and provided at least at 45° C., preferably at 50±2° C.

In one embodiment of step 1), the aqueous solution or syrup containing 2'-FL comprises DFL wherein the 2'-FL:DFL weight ratio is more than 2, preferably more than 4, more preferably more than 6, particularly between 8-13, and provided at least at 45° C., preferably at 50±2° C.

In one embodiment of step 1), the aqueous solution or syrup containing 2'-FL comprises DFL and lactose, wherein the 2'-FL:lactose weight ratio is 10-110 and the DFL:lactose weight ratio is 1-10, and provided at least at 45° C., preferably at 50±2° C.

In one embodiment of step 1), the aqueous solution or syrup containing 2'-FL comprises DFL and lactose, wherein the 2'-FL:DFL weight ratio is more than 6, preferably 8-13, the 2'-FL:lactose weight ratio is 10-110 and the DFL:lactose weight ratio is 1-10, and provided at least at 45° C., preferably at 50±2° C.

In one embodiment of step 1), the aqueous solution or syrup containing 2'-FL has a total solid content of 67-75° Bx and 52-62 wt % of dissolved 2'-FL as estimated by HPLC, and wherein the 2'-FL:DFL weight ratio is 8-13, and provided at least at 45° C., preferably at 50±2° C.

In one embodiment of step 1), the aqueous solution or syrup containing 2'-FL has a total solid content of 70-75° Bx and 56-62 wt % of dissolved 2'-FL as estimated by HPLC, and wherein the 2'-FL:DFL weight ratio is more than 6, preferably 8-13, the 2'-FL:lactose weight ratio is 10-110 and the DFL:lactose weight ratio is 1-10, and provided at least at 45° C., preferably at 50±2° C.

In one embodiment of step 1), the aqueous solution or syrup containing 2'-FL has a total solid content of 67-71° Bx and 52-56 wt % of dissolved 2'-FL as estimated by HPLC, and wherein the 2'-FL:DFL weight ratio is more than 6, preferably 8-13, the 2'-FL:lactose weight ratio is 20-50 and the DFL:lactose weight ratio is 2-6, and provided at least at 45° C., preferably at 50±2° C.

In one embodiment of step 1), the aqueous solution or syrup containing 2'-FL has a total solid content of 67-77° Bx and 62-70 wt %, such as 64-68 wt %, of dissolved 2'-FL as estimated by HPLC, and wherein the 2'-FL:DFL weight ratio is more than 13, preferably more than 25, such as more than 50, and the DFL:lactose weight ratio is less than 1, and provided at least at 45° C., preferably at 50±2° C.

In one embodiment of step 1), the aqueous solution or syrup containing 2'-FL has a total solid content of 70-75° Bx and 62-70 wt %, such as 64-68 wt %, of dissolved 2'-FL as estimated by HPLC, and wherein the 2'-FL:DFL weight ratio is more than 13, preferably more than 25, such as more than 50, and the DFL:lactose weight ratio is less than 1, and provided at least at 45° C., preferably at 50±2° C.

In one embodiment of step 1), the aqueous solution or syrup containing 2'-FL has a total solid content of 67-71° Bx and 62-70 wt %, such as 64-68 wt %, of dissolved 2'-FL as estimated by HPLC, and wherein the 2'-FL:DFL weight ratio is more than 13, preferably more than 25, such as more than 50, and the DFL:lactose weight ratio is less than 1, and provided at least at 45° C., preferably at 50±2° C.

In the second step, to initiate crystallization, crystalline 2'-FL, preferably 2'-FL polymorph II, suspended in acetic acid is added to the aqueous solution or syrup comprising 2'-FL according to step 1) at elevated temperature, preferably at the same temperature as that in step 1), and preferably under continuous stirring, thereby generating a slurry. The amount of acetic acid in the slurry, after addition of the suspension of crystalline 2'-FL, preferably 2'-FL polymorph II, in acetic acid, shall be greater than 1 wt %, preferably greater than 1.5 wt %, more preferably greater than 2 wt %, for example between 2 and 4 wt % or 2 and 3 wt %. The suspension of crystalline 2'-FL, preferably 2'-FL polymorph II, in acetic acid to be added to the aqueous solution or syrup comprising 2'-FL provided in step 1) is of around 10-30 wt % (that is 100 g of the suspension contains around 10-30 g of crystalline 2'-FL, preferably 2'-FL polymorph II). In addition, the amount of the seeding crystal is suitable for generating the slurry. Preferably, the amount of the seeding crystal is at least 0.5 wt % relative to the total solid content of the aqueous solution or syrup provided in step 1), such as 0.5-2 wt %, preferably 0.9-1.2 wt %. The acetic acid suitable in making the above suspension is glacial acetic acid.

Typically, the 2'-FL/acetic acid suspension is added to the aqueous solution or syrup comprising 2'-FL at once, preferably under agitation. After seeding, the mixture is stirred at the same temperature for a couple of hours, such as 1-8 or 3-7 hours, preferably 4-6 hours such as around 5 hours, to generate a slurry.

During the step of initiation crystallization described above no vacuum or reduced pressure is applied.

The use of 2'-FL/acetic acid suspension to seed the aqueous solution or syrup comprising 2'-FL is advantageous, because it represents a different nucleation mechanism as opposed to e.g. the evaporative crystallization disclosed by WO 2018/164937 or the simple addition of seeding crystal, and thus affects the morphology of the obtainable crystalline material.

In one embodiment of step 2), the amount of seeding 2'-FL is 0.5-2 wt % of the solid content of the aqueous solution or syrup provided in step 1), the 2'-FL/acetic suspension is of 10-30 wt % and the amount of acetic acid in the slurry after addition of the suspension is 2-3 wt %.

In one embodiment of step 2), the amount of seeding 2'-FL is 0.9-1.2 wt % of the solid content of the aqueous solution or syrup provided in step 1), the 2'-FL/acetic suspension is of 10-30 wt % and the amount of acetic acid in the slurry after addition of the suspension is 2-3 wt %.

In one embodiment of step 2), the amount of seeding 2'-FL is 0.5-2 wt % of the solid content of the aqueous solution or syrup provided in step 1), the 2'-FL/acetic suspension is of 24±2 wt % and the amount of acetic acid in the slurry after addition of the suspension is 2-3 wt %.

In one embodiment of step 2), the amount of seeding 2'-FL is 0.9-1.2 wt % of the solid content of the aqueous solution or syrup provided in step 1), the 2'-FL/acetic suspension is of 24±2 wt % and the amount of acetic acid in the slurry after addition of the suspension is 2-3 wt %.

In one embodiment of step 2), the agitation under the addition of the 2'-FL/acetic suspension and/or the agitation of the slurry after the addition of the 2'-FL/acetic suspension is conducted at 150-300 rpm.

In one embodiment of step 2), the slurry, after the addition of the 2'-FL/acetic suspension, is agitated for at least 2-5 hours at the same temperature as at which the seeding has been previously performed.

In the next step 3), following step 2), to the slurry obtained above pure acetic acid is added under continuous stirring. In one embodiment, the temperature at which the pure acetic acid is added to the slurry is the same that in the precedent step. In other embodiment, the temperature is lower than in step 2). In a preferred realization, the slurry is first cooled down, typically in around 5-60 mins, or allowed to cool down on its own, to the desired temperature before adding the pure acetic acid, and that temperature is kept over the entire period of the addition of the pure acetic acid. This temperature is, preferably, around 30-40° C., such as around 35±2° C. The amount of acetic acid added in step 3) is calculated so that the acetic acid to water weight fraction in the crystalline suspension at the end of the addition of the acetic acid in step 3) is 4-6, preferably 4.6-6 or 4.6-5.5. In the acetic acid to water weight fraction, the amount of acetic acid shall comprise the acetic acid added in step 3) and the acetic acid that makes up the 2'-FL/acetic acid suspension used for seeding in step 2). The water content of the suspension at the end of step 3) is practically the amount of water in the aqueous solution or syrup comprising 2'-FL provided in step 1) and can be calculated as follows: water wt %=100−Brix [of the aqueous solution or syrup comprising 2'-FL provided in step 1].

The pure acetic acid can be added in step 3) continuously with a given addition rate or in several, preferably equal, portions. The calculated amount of acetic acid is added relatively slowly, in a couple of hours, but not less than in 3 hours, such as not less than 5, 7 or 9 hours, preferably not less than in 10 hours, more preferably in 12±2 hours. At the end of the acetic acid addition, the slurry becomes a crystalline mass.

During the step of adding acetic acid described above no vacuum or reduced pressure is applied.

Optionally, after addition of the pure acetic acid and obtaining a crystalline mass of 2'-FL according to step 3) above, the temperature, if necessary, is decreased to a final temperature in a couple of hours which is between 0° C. and room temperature, preferably around 20-25° C. At this final temperature, the crystalline mass of 2'-FL is stirred for a couple of hours, such as at least for 2 or 3 hours, for example 5±1 hours. During the step of equilibrating the crystalline mass of 2'-FL described above no vacuum or reduced pressure is applied.

In one embodiment of step 3), acetic acid is added to the slurry obtained in step 2) for at least 3 hours to reach an acetic acid to water weight fraction of 4-6 in the crystalline mass.

In one embodiment of step 3), acetic acid is added to the slurry obtained in step 2) for at least 10 hours to reach an acetic acid to water weight fraction of 4-6 in the crystalline mass.

In one embodiment of step 3), acetic acid is added to the slurry obtained in step 2) for 12±2 hours to reach an acetic acid to water weight fraction of 4-6 in the crystalline mass.

In one embodiment of step 3), acetic acid is added to the slurry obtained in step 2) for at least 3 hours to reach an acetic acid to water weight fraction of 4.6-5.5 in the crystalline mass.

In one embodiment of step 3), acetic acid is added to the slurry obtained in step 2) for at least 10 hours to reach an acetic acid to water weight fraction of 4.6-5.5 in the crystalline mass.

In one embodiment of step 3), acetic acid is added to the slurry obtained in step 2) for 12±2 hours to reach an acetic acid to water weight fraction of 4.6-5.5 in the crystalline mass.

In one embodiment of step 3), acetic acid is added to the slurry obtained in step 2) at 35±2° C. for at least 3 hours to reach an acetic acid to water weight fraction of 4-6 in the crystalline mass.

In one embodiment of step 3), acetic acid is added to the slurry obtained in step 2) at 35±2° C. for at least 10 hours to reach an acetic acid to water weight fraction of 4-6 in the crystalline mass.

In one embodiment of step 3), acetic acid is added to the slurry obtained in step 2) at 35±2° C. for 12±2 hours to reach an acetic acid to water weight fraction of 4-6 in the crystalline mass.

In one embodiment of step 3), acetic acid is added to the slurry obtained in step 2) at 35±2° C. for at least 3 hours to reach an acetic acid to water weight fraction of 4.6-5.5 in the crystalline mass.

In one embodiment of step 3), acetic acid is added to the slurry obtained in step 2) at 35±2° C. for at least 10 hours to reach an acetic acid to water weight fraction of 4.6-5.5 in the crystalline mass.

In one embodiment of step 3), acetic acid is added to the slurry obtained in step 2) at 35±2° C. for 12±2hours to reach an acetic acid to water weight fraction of 4.6-5.5 in the crystalline mass.

In step 3), any of the specific embodiments disclosed above is optionally followed by:
  cooling the obtained crystalline mass to 0-25° C., preferably 20-25° C.,
  stirring the obtained crystalline mass for at least 2-3 hours, preferably 5±1 hours, or
  cooling the obtained crystalline mass to 0-25° C., preferably 20-25° C., then stirring it for at least 2-3 hours, preferably 5±1 hours.

The crystalline mass of 2'-FL obtained in step 3) or the optionally equilibrated crystalline mass described above is then filtered in step 4). The crystalline 2'-FL is separated from the mother liquor conventionally, e.g. dead-end filtration, centrifugation or decantation at a temperature between 0° C. and room temperature, preferably around 20-25° C. In some embodiments, the separated 2'-FL crystals, preferably those of 2'-FL polymorph II, are washed with glacial acetic acid. The optionally washed crystals are then dried conventionally.

The crystalline 2'-FL, preferably 2'-FL polymorph II, obtained or obtainable by the method of the invention, has a purity at least 92%, preferably at least 95%, more preferably at least 98% (determined by HPLC), and/or a content of DFL of less than 3%, preferably less than 2% by weight compared to 2'-FL, and/or an acetic acid content of less than 1%, preferably less than 0.5%, and/or a water content of less than 0.5% preferably less than 0.25% or 0.1%. The crystalline 2'-FL, preferably 2'-FL polymorph II, obtained or obtainable by the method of the invention, has the following assay determined by combination of quantitative measurements: 2'-FL: at least 97%, DFL: less than 2%, and acetic acid: less than 0.5%; or 2'-FL: at least 97%, DFL: less than 2%, acetic acid: less than 0.5% and water: less than 0.1%.

The above method provides crystalline 2'-FL, preferably 2'-FL polymorph II, possessing at least one of the following beneficial features that crystalline 2'-FL obtainable by WO 2016/095924 does not have, as it have been demonstrated by comparative tests disclosed in the examples in further detail:

less dusty powder due to larger crystal size (assessed from particle size distribution) and stable crystal morphology to mechanical shear stress,
better filterability that leads to shorter filtration period,
lower volatile content (as measured by loss on drying, LoD) meaning shorter drying period, preferably, the LoD value is reduced by at least 25%, more preferably by at least 40%, even more preferably by at least 50%,
lower residual solvent (i.e. both AcOH and water) content after drying,
better flowability as seen by Carr index and Hausner ratio, increased bulk and tapped density, and/or
higher crystallization yield.

In addition, the above method consumes significantly less (at least 25% less, preferably at least 35% less, such as around 40, 45 or 50% less) AcOH compared to the prior art method according to 2016/095924.

Having the powder properties considerably improved, downstream operations can be significantly facilitated, for example direct formulation processes such as dry mixing.

Furthermore, the claimed crystallization method described above is advantageous over the evaporative crystallization from water disclosed in e.g. WO 2018/164937, because the provision of a supersaturated aqueous solution or syrup comprising 2'-FL from which the 2'-FL is crystallized is not essentially necessary and/or the obtained crystal shows a better property in terms of filterability.

The present crystallization method is highly suitable for selectively crystallizing 2'-FL from an aqueous solution, preferably obtained from fermentation broth, containing 2'-FL and at least one fucosylated carbohydrates other than 2'-FL, particularly DFL, and optionally other carbohydrate-like contaminants, by treating the aqueous solution with acetic acid as disclosed above. This selective crystallization provides 2'-FL of high purity in one step, and typically crystallization of batches of at least 100 g of 2'-FL, such as at least 1 kg, or at least 100 kg, or even at least 1 ton of 2'-FL, can be achieved despite the wide range of concentrations of contaminating sugar-like compounds in such aqueous solutions. In this regard, 2'-FL can be crystallized with a yield of at least 70%, preferably at least 75%, more preferably at least 80%, for example at least 85%.

The aqueous solution or syrup comprising 2'-FL from which 2'-FL is crystallized out according to the present invention is preferably a treated/purified fermentation broth, which fermentation provides 2'-FL by culturing a genetically modified cell. The fermentation is preferably performed as the following.

An exogenously added lactose as acceptor is internalized from the culture medium by a genetically modified cell where it is converted to 2'-FL in a reaction comprising enzymatic fucosylation. In one embodiment, the internalization can take place via a passive transport mechanism during which lactose diffuses passively across the plasma membrane of the cell. The flow is directed by the concentration difference in the extra- and intracellular space with respect to the lactose, which is supposed to pass from the place of higher concentration to the zone of lower concentration tending towards equilibrium. In another embodiment, lactose can be internalized in the cell with the aid of an active transport mechanism, during which it diffuses across the plasma membrane of the cell under the influence of a transporter protein or permease of the cell. Lactose permease (LacY) has specificity towards lactose. Therefore, lactose can be easily taken up by a cell expressing a LacY permease (such a cell is also referred herein to as a LacY$^+$ phenotype cell) by means of an active transport and accumulates in the cell before being fucosylated (see. e.g. WO 01/04341, Fort et al. *J. Chem. Soc., Chem. Comm.* 2558 (2005), Drouillard et al. *Angew. Chem. Int. Ed.* 45, 1778 (2006), WO 2012/112777, WO 2015/036138). Preferably, the cell expressing a lacY gene encoding the lactose permease lacks enzymes that are able to degrade the internalized lactose. Preferably, the cell lacks β1,4-galactosidase activity due to the deactivation or deletion of the endogenous lacZ gene (such a cell is also referred herein to as a LacZ⁻ phenotype cell) or at least has a reduced activity of β1,4-galactosidase, see e.g. *E. coli* with low galactosidase activity according to WO 2012/112777.

In one preferred embodiment, the internalization of lactose takes place via an active transport mechanism mediated by a lactose permease of the cell, more preferably LacY.

Being internalized into the cell, the lactose is fucosylated by means of a fucosyl transferase expressed by a corresponding heterologous gene or nucleic acid sequence which is introduced into the cell by known techniques, e.g. by integrating it into the chromosome of the cell or using an expression vector. The fucosyl transferase necessary for making 2'-FL is an α-1,2-fucosyl transferase. The corresponding donor providing the fucose residue for fucosylation, GDP-Fuc, can be made by the cell under the action of enzymes involved in the *de novo* biosynthetic pathway of GDP-Fuc (ManB, ManC, Gmd and WcaG) in a stepwise reaction sequence starting from a simple carbon source like glycerol, fructose or glucose. Alternatively, the genetically modified cell can utilize salvaged fucose that is phosphorylated by a kinase followed by the conversion to GDP-Fuc by a pyrophosphorylase (see e.g. WO 2010/070104).

2'-FL can be produced by a genetically modified microorganism in accordance with e.g. Drouillard et al. *Angew. Chem. Int. Ed.* 45, 1778 (2006), WO 01/04341, WO 2010/070104, WO 2010/142305, WO 2012/112777, WO 2015/032412, WO 2015/036138, WO 2015/197082, WO 2017/101958, WO 2017/188684, US 2017/0152538, WO 2018/077892, WO 2018/194411 or WO 2019/008133.

In preferred embodiments, the genetically modified microorganism is *E. coli*.

Accordingly, in a preferred embodiment, the production process comprises the following steps:
a) providing a genetically modified *E. coli* cell of LacY⁺ phenotype or LacZ⁻, LacY⁺ phenotype, wherein said cell comprises:
  an α-1,2-fucosyl transferase, and
  one or more genes encoding a biosynthetic pathway to GDP-Fuc, and
b) culturing the genetically modified *E. coli* cell of LacY⁺ phenotype or LacZ⁻, LacY⁺ phenotype in the presence of exogenous lactose and a suitable carbon source, thereby producing a fermentation broth comprising 2'-FL.

The *E. coli* strain preferably has only one type of recombinant glycosyl transferase encoding gene, which glycosyl transferase is an α-1,2-fucosyl transferase, more preferably the α-1,2-fucosyl transferase encoded by the futC gene from *Helicobacter pylori*.

The fermentation broth so-produced comprises 2'-FL both in the producing cells and the culture medium. To harvest the intracellular 2'-FL and thereby to raise the titre of the product, the method described above may further comprise an optional step c) of disrupting or permeabilizing the cells, e.g. by heating.

The fermentation broth that comprises the neutral HMO can be accompanied by other carbohydrate compounds. Typically, another carbohydrate compound is lactose which is used as acceptor in the fermentation process and left unconverted. Although its amount can be substantially reduced in the fermentation broth before subjecting it to the separation/purification steps disclosed below, e.g. as disclosed in WO 2012/112777 or WO 2015/036138, it is not necessary to do so. The purification method, in one embodiment, is suitable to separate 2'-FL accompanied by carbohydrate compounds from non-carbohydrate contaminants, while the relative proportion of the carbohydrate compounds does not substantially change in the course of the claimed method. Another embodiment of the claimed method, however, is suitable to purify the neutral HMO by separating it from carbohydrate and non-carbohydrate contaminations, thereby providing 2'-FL in substantially pure form.

Accordingly, the accompanying carbohydrate in the fermentative production of 2'-FL is mainly lactose and DFL (Fucα1-2Galβ1-4[Fucα1-3]Glc) as overfucosylated 2'-FL that has similar biological properties to 2'-FL. Moreover, there can be further non-HMO carbohydrate contaminants in the fermentation broth. These are typically lactulose and its glycosylated derivatives. Lactulose may be formed from lactose by rearrangement when lactose is heat-sterilized before adding it to the fermentation and/or during the fermentation. As lactulose is also internalized by the cell, it can be glycosylated, similar to lactose, in a concurrent biotransformation reaction. However, the amount of lactulose and its glycosylated derivatives does not exceed a couple of tenth weight % of the overall dry solid matter of the broth after biomass separation.

From the fermentation broth, non-carbohydrate particles and substances are removed/separated. This process can include a conventional demineralization step during which minerals, salts and other charged molecules are extracted from the fermentation broth containing 2'-FL and the other carbohydrates. The demineralization can be conducted using conventional ion exchange resins, e.g. passing the fermentation broth through a cation exchange resin in H⁺-form and an anion exchange resin in free base form. The cation exchange resin is preferably a strong exchanger, and the anion exchange resin can be a weak or strong exchanger. The ion exchange resins, besides removing salts and charged molecules from the broth, can physically adsorb proteins, DNA and colorizing/caramel bodies that optionally have been left in the broth after previous purification steps. Alternatively, the demineralization can be conducted by means of a conventional electrodialysis or a conventional membrane filtration/diafiltration system using an appropriate particle size cut-off. The solution obtained in any of the above ways can then be concentrated by either a conventional evaporation step or a conventional nanofiltration step.

In addition, the above process removing/separating non-carbohydrate particles and substances from carbohydrates are can also include a conventional charcoal treatment to remove color bodies and optionally water soluble biomolecules (e.g. nucleic acids, peptides, proteins, amino acids, exopolysaccharides and lipids) left from previous purification steps. Charcoal has a weaker affinity for carbohydrate compounds in aqueous medium than for some water-soluble lipophilic contaminants (e.g. proteins and amino acids containing lipophilic moieties, lipids and colored aromatic bodies). Thus, the carbohydrates, free of the lipophilic contaminants on the charcoal, can be easily washed from the charcoal with (distilled) water. Moreover, the above process can also include a conventional clarification step for removing cells, cells fragments and proteins after fermentation, preferably prior to the charcoal treatment described above. The clarification can be done in a conventional manner, e.g.

by sedimentation in centrifuge producing a clarified or partially clarified supernatant solution. Alternatively, the fermentation broth can be subjected to ultrafiltration in a conventional manner to remove high molecular weight components. The semipermeable membrane used for ultrafiltrating a 2'-FL fermentation broth can suitably have a cut off of 5-50 kDa, preferably 10-25 kDa, more preferably around 15 kDa. Depending on the characteristics of the fermentation broth to be clarified combination of higher and lower cut off membranes (in this order) within the above given range can be employed. Optionally, centrifugation or ultrafiltration can be followed by nanofiltration, during which the aqueous solution containing 2'-FL and accompanying carbohydrates is concentrated in a conventional manner before it is treated with charcoal. In this nanofiltration step, its membrane can have a pore size that ensures retention of 2'-FL having a molecular weight of 488; so typically a 200-300 Da cut off membrane can be used. Alternatively, if the UF permeate contains a higher amount of lactose, the membrane suitable for nanofiltration has a MWCO of 600-3500 Da ensuring the retention of 2'-FL and allowing at least a part of lactose to pass through the membrane, and the active (top) layer of the membrane is composed of polyamide, wherein the $MgSO_4$ rejection factor on said membrane is around 20-90%, preferably 50-90%. In case of a relatively high rejection (about 90%) of lactose, a subsequent diafiltration with pure water may be necessary to bring all or at least the majority of the lactose in the permeate. The higher the lactose rejection the more diafiltration water is necessary for efficient separation. This nanofiltration membrane shall be tight for 2'-FL in order that it is efficiently retained. Preferably, the rejection of 2'-FL is more than 95%, more preferably 97%, even more preferably 99%. Membranes with MWCO of more than 3500 Da are expected to allow more or significant amount of 2'-FL pass through the membrane thus show a reduced retention of 2'-FL and therefore are not suitable. It is preferred that the rejection of the lactose is not more than 80-90%. If the lactose rejection turns to be 90±1-2%, the 2'-FL rejection shall preferably be around 99% or higher in order to achieve a practically satisfying separation. These requirements are simultaneously fulfilled when the membrane is relatively loose for $MgSO_4$, that is its rejection is about 50-90%. In this regard the above specified membrane is tight for 2'-FL and loose for monosaccharides and lactose, and as well as for $MgSO_4$. Therefore, it is possible to separate lactose, the precursor in making 2'-FL by fermentation, from 2'-FL by nanofiltration with a good efficacy, and additionally a substantial part of divalent ions also passes to the permeate. Also preferably, the membrane has a rejection factor for NaCl that is lower than that for $MgSO_4$. At a NaCl rejection of around 20-30%, a substantial reduction of all monovalent salts in the retentate is also achievable. The active or the top layer of the above nanofiltration membrane is preferably made of polyamide, more preferably the polyamide membrane is a polyamide with phenylene diamine or piperazine building blocks as amine, even more preferably piperazine (referred to as piperazine-based polyamide, too). An example of suitable piperazine based polyamide TFC membranes is TriSep® UA60.

EXAMPLES

General:

The term "Brix" refers to degrees Brix, that is the sugar content of an aqueous solution (g of sugar in 100 g of solution). In this regard, Brix of the 2'-FL solution of this application refers to the overall carbohydrate content of the solution including 2'-FL and its accompanying carbohydrates and thus practically represents the total dissolved solid (TDS). Brix was measured by a calibrated refractometer at room temperature. The Brix measurement was validated by measuring the remaining water fraction of the solution using Karl-Fischer titration.

HPLC: The concentration of impurities was analyzed by HPLC on apHera $NH_2$ polymer (250 mm×4.6 mm; 5 μm) with 72 v/v % acetonitrile (ACN) at flow rate of 1.1 ml/min and 25° C. using charged aerosol detector (CAD). The concentration of 2'-FL was measured by HPLC on TSKgel Amide-80 (150 mm×4.6 mm, particle size: 3 μm) with 64 v/v % acetonitrile at flow rate of 1.1 ml/min and 25° C. using refractive index detector at 37° C.

The water content of dried crystal powder was measured by Karl-Fischer titration. Residual AcOH content was measured using Megazyme K-ACETRM 07/12.

Powder X-ray diffraction investigations were conducted with a Philips PW 1830/PW1050 instrument in transmission geometry, using CuKα radiation made monochromatic by means of a graphite monochromator. D-spacings were calculated from the 2Θ values, based on a wavelength of 1.54186 Å. As a general rule the 2Θ values have an error rate of ±0.2 Å. Based on their diffractograms, all crystalline 2'-FL samples produced according to the examples below proved to be polymorph II as disclosed in WO 2011/150939.

Fermentation and purification: 2'-FL-containing broth was generated by fermentation using a genetically modified E. coli strain of $LacZ^-$, $LacY^+$ phenotype, wherein said strain comprises a recombinant gene encoding an α1,2-fucosyl transferase enzyme which is able to transfer fucose of GDP-fucose to the internalized lactose and genes encoding a biosynthetic pathway to GDP-fucose. The fermentation was performed by culturing the strain in the presence of exogenously added lactose and a suitable carbon source, e.g. according to WO 2015/197082 or WO 2016/095924, thereby producing 2'-FL which was accompanied with DFL (≈5-14% to 2'-FL) and unreacted lactose (≈0.8-10% to 2'-FL) as major carbohydrate impurities in the fermentation broth. The broth was treated as follows: ultrafiltration, nanofiltration, active charcoal decolourization and ion exchange treatment with strong acidic ($H^+$) resin and weak basic resin.

Example 1

The treated aqueous fermentation broth containing 2'-FL, DFL and lactose was concentrated to 73.0° Bx (238.3 g; containing 57.4 wt % of 2'-FL, 1.6 wt % of lactose and 6.4 wt % of DFL) then added into a 1 l crystallizer. The syrup was heated to 50° C. while agitating at 150 rpm. Crystallization of the preheated clear syrup was initiated by loading 1 wt % 2'-FL polymorph II crystals relative to the total solids according to Brix. Seed crystals were loaded after suspending in acetic acid at 24.1 wt %. The slurry was agitated for 5 h followed by cooling down to 35° C. Acetic acid was then added to the slurry over 12 h to reach an acetic acid to water weight fraction of 4.69. At the end of acetic acid feeding the crystalline mass was cooled down to 25° C. while agitating for further 5 h.

A sample of the slurry (75 ml) was collected and pressure filtered at 1 bar. Another sample of the slurry (75 ml) was collected, pressure filtered at 1 bar and the filter cake was washed with acetic acid (28 g). The washed and the unwashed solid wet filter cakes were dried overnight at 65° C. and 50 mbar generating loss on drying (LoD) of 17.3% and 23.2 respectively. The concentrations of 2'-FL and other impurities in the mother liquor as well as dried solids were assayed via HPLC. The unwashed dried crystalline material contained 95.3% of 2'-FL and yielded 81.5% of crystalline 2'-FL polymorph II, while the purity of the washed filter cake increased to 97.0%.

Example 2

The protocol of Example 1 was followed with the following parameters (parameters not mentioned specifically are the same as in Example 1):
the concentrated syrup was of 71.0° Bx (166.8 g; containing 60.9 wt % of 2'-FL, 0.6 wt % of lactose and 4.9 wt % of DFL);
the acetic acid to water weight fraction at the end of acetic acid addition was 5.58.

The unwashed solid wet filter cake was dried overnight at 65° C. and 50 mbar generating loss on drying (LoD) of 24.7%. The unwashed dried crystalline material contained 98.1% of 2'-FL and yielded 86.2% of crystalline 2'-FL polymorph II.

Example 3

The protocol of Example 1 was followed with the following parameters (parameters not mentioned specifically are the same as in Example 1):
the concentrated syrup was of 74.5° Bx (148.3 g; containing 57.9 wt % of 2'-FL, 4.4 wt % of lactose and 5.4 wt % of DFL);
the syrup was heated to and seeded at 35° C.;
the acetic acid to water weight fraction at the end of acetic acid addition was 4.70.

The washed and the unwashed solid wet filter cakes were dried overnight at 65° C. and 50 mbar generating loss on drying (LoD) of 16.1% and 22.5%, respectively. The unwashed dried crystalline material contained 95.7% of 2'-FL and yielded 81.0% of crystalline 2'-FL polymorph II, while the purity of the washed filter cake increased to 99.9%.

Example 4

The protocol of Example 1 was followed with the following parameters (parameters not mentioned specifically are the same as in Example 1):
the concentrated syrup was of 69.0° Bx (161.4 g; containing 54.3 wt % of 2'-FL, 1.4 wt % of lactose and 6.0 wt % of DFL);
the syrup was heated to and seeded at 35° C. while agitated at 300 rpm;
the slurry after seeding was agitated for 2 h;
acetic acid was added over 15 h;
the acetic acid to water weight fraction at the end of acetic acid addition was 4.68.

The unwashed solid wet filter cake was dried overnight at 65° C. and 50 mbar generating loss on drying (LoD) of 48.5%. The unwashed dried crystalline material contained 92.8% of 2'-FL and yielded 84.9% of crystalline 2'-FL polymorph II.

Example 5 (Comparative Tests)

A sample of the crystallization slurry (75 ml) after completing the crystallization from examples 1-3 above, respectively, and from the prior art (according to WO 2016/095924 example 2, with the difference that the procedure was conducted at 35° C. instead of room temperature and the concentrated syrup was of 62° Bx (140.2 g; containing 48.8 wt % of 2'-FL, 1.3 wt % of lactose and 5.4 wt % of DFL)) was collected and pressure filtered at $\Delta P = 1$ bar using a polypropylene filter cloth with a pore size of about 3 µm and a filtration area of 13 cm$^2$, and the time until the beginning of the liquid-gas mass transfer was measured. The filterability of the slurries was compared by calculating an overall filtration rate according to the following equation: filtrate volume [cm$^3$]/(time [sec]·filter area [cm$^2$]).

Then the filtration was continued for 60 sec. The so-obtained solid wet filter cake was dried overnight (14 hours) at 65° C. and 50 mbar, and loss of drying was determined (see data in the table below).

|  | Example 1 | Example 2 | Example 3 | WO 2016/ 095924 |
|---|---|---|---|---|
| filtration rate (cm/sec) | 0.39 | 0.62 | 0.16 | 0.064 |
| filterability improvement relative to prior art | 6.12x | 9.78x | 2.57x | — |
| LoD (%) | 23.2 | 24.7 | 22.5 | 52.9 |
| LoD relative to prior art | 0.44-fold lower | 0.46-fold lower | 0.42-fold lower | — |
| H$_2$O content (wt %) | 0.06 | 0.05 | not determined | 0.63 |
| AcOH content (wt %) | 0.15 | 0.36 | 0.11 | 0.58 |

The data show that the new crystallization method according to the invention produces crystals that are easier to filter and dry. The crystals producible by the novel method have much lower amount of volatile residue, especially acetic acid, after drying.

Further variations: basically the same improved powder properties were achievable from concentrated syrups of 71-74° Bx containing 64-68 wt % 2'-FL (typically when DFL is less than 2 to 2'-FL) under the crystallization conditions disclosed above.

The invention claimed is:
1. A method for crystallizing 2'-FL comprising:
   i) providing an aqueous solution or syrup comprising 2'-FL at a temperature of 35-60° C.,
   ii) while maintaining the temperature of the aqueous solution or syrup at 35-60° C., adding a 10-30 wt % suspension of crystalline 2'-FL in acetic acid to the aqueous solution or syrup comprising 2'-FL, thereby generating a slurry wherein the amount of acetic acid in the slurry, after addition of the suspension of crystalline 2'-FL in acetic acid is 1.5-4 wt %,
   iii) at a temperature of 35-60° C., adding acetic acid to the slurry until the ratio of acetic acid to water is 4-6 to form a diluted slurry,
   iv) obtaining a crystalline mass from the diluted slurry, and
   v) filtering the crystalline 2'-FL from the crystalline mass.
2. The method according to claim 1, wherein the crystalline 2'-FL is polymorph II.
3. The method according to claim 1, wherein the acetic acid added in step i), ii), or both steps i) and ii) is glacial acetic acid.
4. The method according to any of the claims 1, wherein total solid content of the aqueous solution or syrup according to step i), as measured with a calibrated refractometer, is 57-80° Bx, and the concentration of 2'-FL in the aqueous solution or syrup according to step i) is 40-70 wt %.

5. The method according to claim 4, wherein an aqueous solution or syrup comprising 2'-FL further comprises DFL and optionally lactose.

6. The method according to claim 5, wherein the aqueous solution or syrup comprising 2'-FL, DFL and optionally lactose comprises
- a 2'-FL:DFL weight ratio more than 13, and a DFL:lactose weight ratio is less than 1, or
- a 2'-FL:lactose weight ratio of 10-110 and a DFL:lactose weight ratio of 1-10.

7. The method according to claims 6, wherein 2'-FL:DFL weight ratio is more than 25.

8. The method according to claim 5, wherein the 2'-FL:DFL weight ratio is more than 2.

9. The method according to claim 5, wherein the 2'-FL:lactose weight ratio is 10-110 and the DFL:lactose weight ratio is 1-10.

10. The method according to claim 4, wherein the total solid content of the aqueous solution or syrup according to step i) 67-77° Bx, and the concentration of 2'-FL in the aqueous solution or syrup according to step i) is 52-62 wt %.

11. The method according to claim 10, wherein the total solid content of the aqueous solution or syrup according to step i) 70-75° Bx.

12. The method according to claim 10, wherein the total solid content of the aqueous solution or syrup according to step i) 67-75° Bx, and the aqueous solution or syrup is provided at least at 45° C.

13. The method according to claim 4, wherein the total solid content of the aqueous solution or syrup according to step i) 67-77° Bx, and the concentration of 2'-FL in the aqueous solution or syrup according to step i) is 62-70 wt %.

14. The method according to claim 13, wherein the concentration of 2'-FL in the aqueous solution or syrup according to step i) is 64-68 wt %.

15. The method according to claim 1, wherein the amount of the crystalline 2'-FL in the suspension of crystalline 2'-FL in acetic acid added in step ii) is 0.5-2 wt % relative to the total solid content of the aqueous solution or syrup provided in step i).

16. The method according to claim 15, wherein the amount of acetic acid in the slurry after addition of the suspension in step ii) is 2-3 wt %.

17. The method according to claim 16, wherein the 2'-FL/acetic suspension added in step ii) is of 24±2 wt %.

18. The method according to claim 1, wherein the addition of acetic acid in step iii) is performed at a temperature of 30-40° C.

19. The method according to claim 18, wherein the acetic acid to water weight fraction in the crystalline suspension at the end of the addition of the acetic acid is 4.6-6.

20. The method according to claim 1, wherein the crystalline mass obtained in step iii) is cooled to 0-25° C. and stirred for 5±1 hours.

* * * * *